Figure 1:
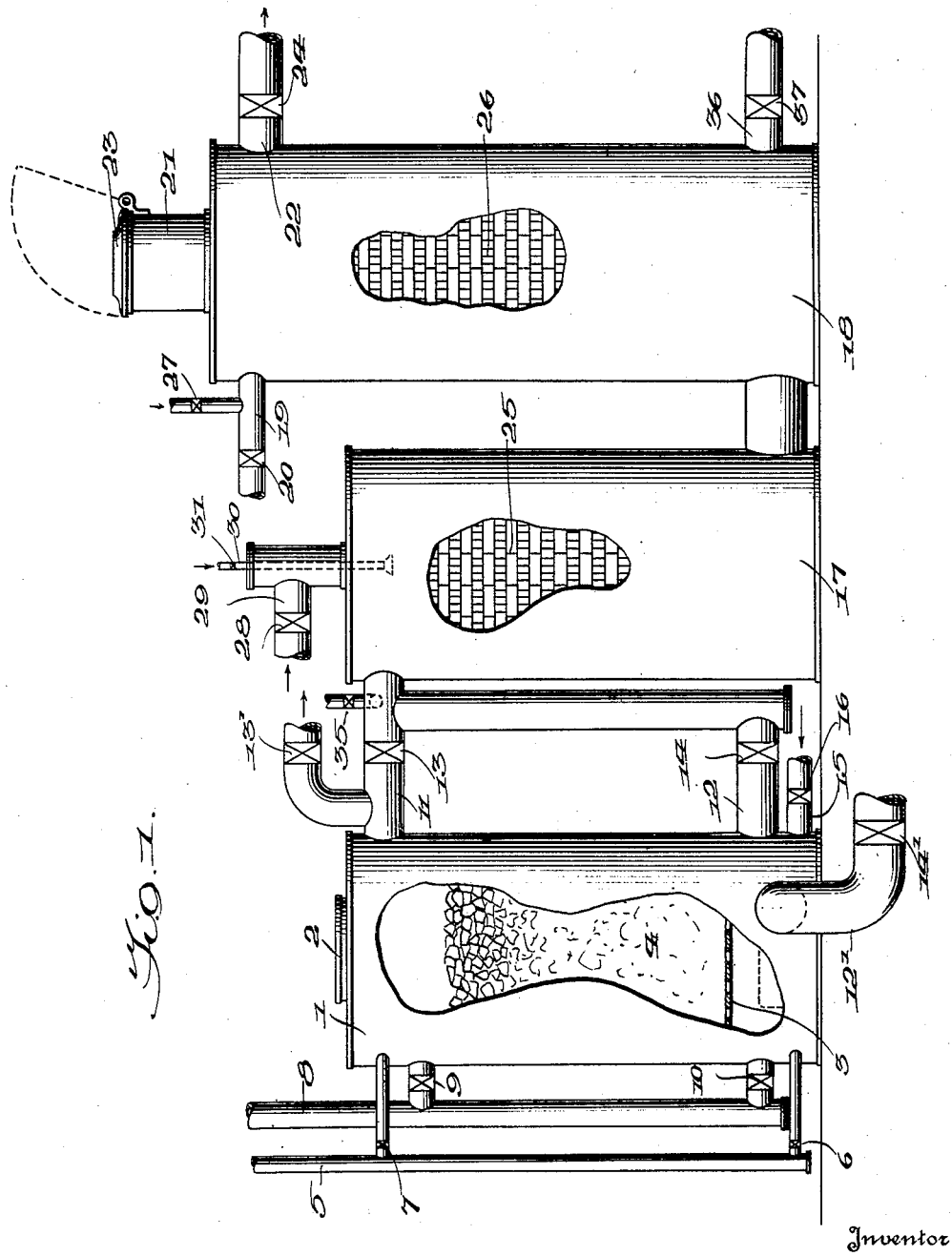

Oct. 10, 1933.  W. W. ODELL  1,930,443
PROCESS OF MAKING COMBUSTIBLE GAS
Filed May 22, 1930  2 Sheets-Sheet 1

Inventor
Wm W. Odell,
By Pennie, Davis, Marvin and Edmonds.
Attorney

Patented Oct. 10, 1933

1,930,443

UNITED STATES PATENT OFFICE 1,930,443

PROCESS OF MAKING COMBUSTIBLE GAS

William W. Odell, New York, N. Y., assignor to Columbia Engineering & Management Corporation, New York, N. Y., a corporation of Ohio Application May 22, 1930. Serial No. 454,706

4 Claims. (Cl. 48—196)

This invention relates to a process which consists in generating combustible gas containing hydrogen and carbon monoxide, using one or more hydrocarbons as a fuel for the generation of at least a part of it; natural gas being a ready and low priced source of supply of said hydrocarbons. An important part of the process is based upon the chemical reactions occurring when the hydrocarbons are subjected to the action of heat, i. e., when they are caused to contact heated surfaces, particularly in the presence of steam; the contacting surface may be carbonaceous or other substance.

An object of my invention is to utilize economically the paraffin hydrocarbons which, in the natural gas fields, are so frequently wasted.

Another object of my invention is to produce a gas, using said hydrocarbons, which will have predetermined proportional amounts of hydrogen and carbon monoxide.

A further object is to provide a flexible means of producing gas using hydrocarbons in chemical reactions with steam in the generation of a part thereof.

It should be noted that with the advent of the new and improved oil-cracking processes in oil refining practice so much of the low-density hydrocarbons is formed that a limit has been put upon the amount of the latter which can be present in natural-gas gasoline used in blending; and this has resulted, in very recent months, in the availability of large quantities of $C_2H_6$, $C_3H_8$, $C_4H_{10}$, and natural gasoline which can be obtained either in a high degree of purity or mixed with each other or with methane. The propane ($C_3H_8$) and butane ($C_4H_{10}$) are now wasted to a large extent by being burned in "pilots" in some of the natural-gas fields even in those fields where the methane and ethane are piped to centres of consumption.

My invention relates to the re-forming of hydrocarbons, preferably gaseous hydrocarbons such as natural gas, products obtained from natural gas by condensation, olefins or mixtures thereof by causing in effect their reaction or partial reaction with steam. My process differs from others, as far as I am aware, in that the hydrocarbon is introduced into superheated steam (steam heated to about 1200° to 2000° F.) and the two are caused to mix and pass through a porous, hot refractory mass whereby they are heated to a temperature above 1200° F., the heated mixture is then caused to pass downwardly through a porous mass of incandescent solids such as coke or refractory, and chemical reaction caused to occur whereby CO and $H_2$ are formed substantially free from entrained carbon resulting from decomposition of said hydrocarbons. When hydrocrabons having a greater molecular weight than .16, which is that of methane, are used, appreciable decomposition and chemical reaction occurs in the passage of the gas-steam mixture through the heated porous mass of contact material. It will be noted that in this manner of operating carbon can not be formed and deposited in the superheater; the hydrocarbons being introduced into the superheated steam have a higher initial lineal velocity than when introduced into the same amount of saturated steam because of the difference in steam volume resulting from heating. The advantage of this is three-fold, namely, it reduces to a minimum the tendency for any initially formed carbon to deposit in the carburetor; it permits mixing of the steam and hydrocarbons at a high temperature and permits the heating of any carbon particles formed to a high temperature before passing into the generator; and, it tends to preserve methane simultaneously allowing the reaction of other hydrocarbons with said steam. The latter becomes evident when it is realized that intimate contact with highly heated surfaces is necessary for the pyrolysis of methane whereas the higher hydrocarbons dissociate when heated irrespective of time and intimacy of contact with heated surfaces.

A further advantage of re-forming hydrocarbons on down-runs only through the fuel bed has to do with safety in operation. When hydrocarbons are introduced beneath the grates of the generator there is always the danger that they might, to a dangerous extent, leak through the air-blast valve into the air-supply line during a make period, and subsequently, during a blast period the mixed air and hydrocarbons might explode. The force of such an explosion may be much greater than with similar mixtures of air with leaner gas. This can not happen when the hydrocarbons are introduced from above the fuel bed only, as manifested by the drawings.

Still another advantage derived from making the gas-steam runs downwardly only is that a greater percentage of the hydrocarbon gas can be used in admixture with steam, yielding a re-formed gas containing a greater per cent of hydrogen than on up runs without having carbon entrained in the gas. This probably is because the fuel bed is denser during down-runs than during up-runs and more completely filters any small amount of carbon that may be liberated from the hydrocarbon compounds during processing.

While I prefer to have the gaseous mixture with steam heated to a temperature approaching 2000° F. and at least 1200° F. when introduced into the fuel; nevertheless it is beneficial to have it heated even to as low a temperature as 1000° F. The reaction of the higher hydrocarbons with steam is much more complete at temperatures above 1200° F. than at lower temperatures. By "higher" hydrocarbons is meant those having a higher molecular weight than 16.

I find it possible to produce hydrogen and carbon monoxide, using the paraffin hydrocarbons, at a lower cost than when using solid fuel only at nominal prices. I also find that this gas can be enriched with hydrocarbons at a lower cost than that of ordinary carbureted water gas.

The chemical equations of interest and which are alluded to hereinafter are as follows:

(1) $2H_2 + CO = CH_3OH$
(2) $CH_4$ upon heat cracking $= C + 2H_2$
(3) $C_2H_6$ upon heat cracking $= 2C + 3H_2$
(4) $C_3H_8$ upon heat cracking $= 3C + 4H_2$
(5) $C_4H_{10}$ upon heat cracking $= 4C + 5H_2$
(6) $CH_4 + H_2O = CO + 3H_2$
(7) $C_2H_6 + 2H_2O = 2CO + 5H_2$
(8) $C_3H_8 + 3H_2O = 3CO + 7H_2$
(9) $C_4H_{10} + 4H_2O = 4CO + 9H_2$
(10) $C + H_2O = CO + H_2$
(11) (6+10) $CH_4 + C + 2H_2O = 2CO + 4H_2$
(12) (7+10) $C_2H_6 + C + 3H_2O = 3CO + 6H_2$
(13) (8+10) $C_3H_8 + C + 4H_2O = 4CO + 8H_2$
(14) (9+10) $C_4H_{10} + C + 5H_2O = 5CO + 10H_2$
(15) $C_nH_{2n+2} + nH_2O = nCO + (2n+1)H_2$
(16) $C_nH_{2n} + nH_2O = nCO + 2nH_2$ In the above there are three classes of reactions; Equations 2 to 5 inclusive show the effect of completely cracking the paraffins by the application of heat; Equations 6 to 9 inclusive show the effect of heating them in the presence of sufficient steam to combine with the carbon by the water-gas reaction as shown in Equation 10. Equations 11 to 14 inclusive are respectively combinations of 6, 7, 8 and 9 with Equation 10. It will be observed that in each of these "combination equations" the volume ratio of $H_2$ to CO in the products of reaction is 2 to 1, which is a desirable proportion for the production of synthetic methanol by Equation 1. It is obvious then that in the generation of the ideal water-gas ($CO + H_2$ mixture) using paraffin hydrocarbons there is a preferred proportion of steam and carbon to be used with the latter, and this proportion is shown by the combination-equations 11 to 14. In common practice in generating water-gas a much larger amount of steam is necessarily used than enters into the chemical reaction and this will hold true in this instance. Therefore in controlling the reactions 11 to 14 it is necessary to use substantially that quantity of the hydrocarbons which will increase the volume ratio $H_2$ to CO above that of Equation 10, in which the ratio is 1 to 1. The ratio can be varied at will within certain limits; Equation 6 shows the conditions for a ratio of 3 to 1 and the other equations show smaller ratios; that in Equation 10 in which no hydrocarbons enter the reaction, being 1 to 1. The low limit is about 1 to 1.1 but there is practically no upper-limit ratio short of infinity when reactions 2 to 5 are considered. The latter reactions do not represent efficient gasification and are not of themselves new. The process of making water gas (CO and $H_2$ mixtures) having a hydrogen-carbon monoxide ratio of substantially 2 to 1 by the high temperature reactions represented by Equations 11, 12, 13 and 14 or combinations of them, using a substantially definite proportion of hydrocarbons, steam and carbon in the reactions as shown, is believed to be a new combination in the art. I find that in making gas-steam down-runs I am able to generate a gas, substantially free from entrained carbon resulting from pyrolysis, in which the molecular ratio of hydrogen to carbon monoxide can be varied between the limits of 1.1 to 3.5. Thus it is apparent that the reaction shown in Equation 10, commonly known as the water-gas reaction, need not enter into or become a part of the reaction producing a mixture of $H_2$ and CO—other than in the conversion of the carbon of hydrocarbons to CO. In other words, additional carbon is not necessary.

Figure 2:
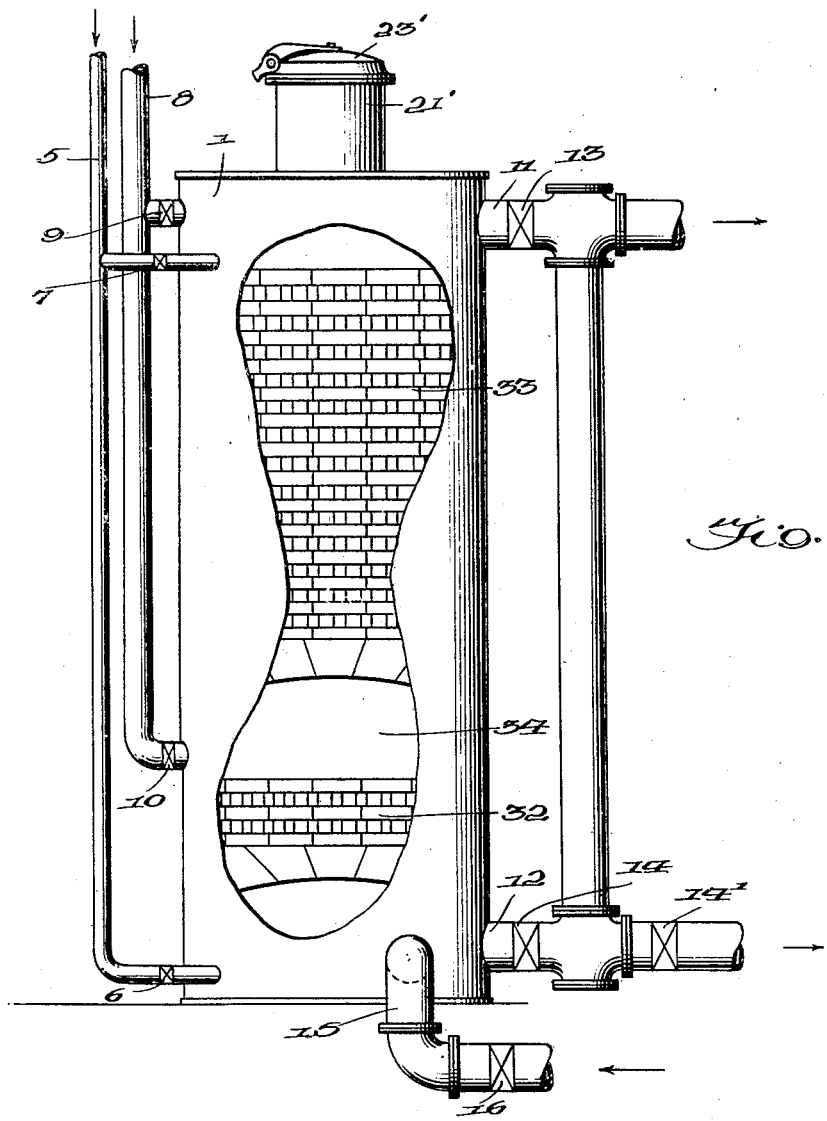

The apparatus in which I am able to make gas by my process is shown in Figures 1 and 2. Fig. 1 is a front elevation of a suitable gas generator set, with portions of the shells cut away to show the interior in section for clearness. The generator is shown connected with double checker chambers such as carburetor and superheater of a carburetted-water-gas set, but obviously it can function without the latter. Fig. 2 is a front elevation of the primary generator by itself, that is, not connected with additional checker chambers.

In Fig. 1, 1 is the generator shell, having door 2 for placing solid contact material shown at 4, supported as by bars 3. The steam supply line is shown at 5, having inlet control valves for up and down-run steam respectively at 6 and 7. Hydrocarbon gas is supplied to the generator through supply-line 8, having inlet control valves 9 and 10. The offtakes for finished gas are shown at 11, 12 and 12', and the respective control valves are shown at 13, 14 and 14'. Air is supplied through inlet 15, and control valve 16. The checker chambers 17 and 18 are so connected that gas from 13 and 14 can be passed through them and cut through offtakes 21 and 22 by controlling valves 23 and 24. A connection for hydrocarbon gas is shown at 19 with control valve 20. Checkerbrick of contact material is shown at 25 and 26 and a steam control valve at 27 for introducing steam into chamber 18. Secondary air is admitted through 28 and 29, and the enricher, oil or other carburetting material, is introduced through 30 and 31. A steam inlet for cooling back-flow gas and valves is shown at 35. An inlet for hydrocarbons used in generating the mixtures of hydrogen and carbon monoxide is shown at 36, having control valve 37. It is noted that a similar effect can be obtained by placing this inlet connection at the base of 17 or in the conduit 17' connecting 17 with 18.

In Figure 2 substantially the same system of numbering is used. However, the generator 1 does not have a fuel charging door for solid fuel but in its place a stack 21' with lid 23'. When operated as a single unit, not connected with additional checker chambers, 21' and 23' may be considered the same as 21 and 23 of Figure 1. The checker brick or other contact material shown at 32 and 33 takes the place of solid fuel and may also take the place of checker bricks 25 and 26 of the latter figure when operated as a single unit. The chamber 34 is a combustion chamber in which gas coming through 10 is burned during the air blasting period by the introduction of air from 15 which is preheated by passing through the contact material 32.

Referring to Fig. 1, the preferred method of operating by my process comprises: air blasting the ignited fuel bed 4 in generator 1 through inlet 15, conducting the resulting blast gases into the so-called carburetor through valve 13, burning the blast gases in chambers 17 and 18, discharging the stack gases through outlet 21 discontinuing said air blasting, closing stack valve 23, introducing steam through 19 into chamber 18, causing it to be superheated therein, introducing into said superheated steam a hydrocarbon gas, vapor, or atomized hydrocarbon liquid through inlet 36, causing said gas and superheated steam to become thoroughly mixed and heated to a temperature above 1000° F. in their passage through chamber 17, conducting the heated mixture out of chamber 17 and into the fuel bed in generator 1. Preferably, the relative amounts of steam introduced through 19 and hydrocarbon introduced through 36 are such that the gas leaving the generator 1 is substantially free from suspended carbon resulting from pyrolysis and preferably has a hydrogen-carbon monoxide ratio varying within the limits of 1.1 to 3.5. Although it is apparent from Fig. 1 that steam and hydrocarbons may be introduced into the system at other points than through 19 and 36 respectively and although atomized liquid hydrocarbons may be used effectively when introduced through inlet 36, nevertheless it is preferable and ordinarily advantageous to introduce all of the process steam through inlet 19 and all of the hydrocarbon in the gaseous form through inlet 36. When the hydrocarbon introduced through 36 is under normal conditions a liquid it is commonly desirable to introduce some steam along with it through 36. It is apparent that the apparatus affords means for carrying out various modifications of the process as above described but the process just described is preferred for the purpose intended. For example, it will be evident that the "make" gas can be discharged from generator 1 without passage through the so-called carburetor 17 and superheater 18 which permits a wider field of usefulness of 17 and 18 than in the corresponding carburetor and superheater of the ordinary water gas set.

The hydrocarbon gas may be introduced during each up-run, during a portion of each run during both up and down runs, or during a certain, predetermined percentage of the total number of runs. Furthermore, an excess of hydrocarbon gas may be used, that is, beyond the normal end of the run period. In the latter period the gas is not completely cracked and functions chiefly as a heat-carrying agent, helping to equalize the temperature in the generator 1, and to carburet the "make gas". Then a mixture of hydrocarbons is introduced into the generator 1, as through 9, 10 or 11, during a prolonged part of a run, the higher members only of the series are appreciably cracked. In this manner the amount of cracking and the nature of the finished gas can be predetermined. Attention is called to the fact that the heat absorbed in the generator 1 according to Equation 6 is much less than is absorbed by Equation 10, hence for a definite temperature condition in the generator the quantity of gas which can be made according to the former is greater than that which can be made according to Equation 10. Similar comparisons can be made between Equation 10 and Equations 7, 8, 9, 15 and 16, the volume ratios being slightly different in each case, but the same general relation exists as a study of the equations will reveal. It appears that not only is the capacity of the generator increased when re-forming gas, and the gasification efficiency raised above that of normal water-gas practice, but the overall efficiency in making re-formed and carburetted re-formed gas and employing hydrocarbon gas as described is higher than other processes using hydrocarbons, such as the combined oil-gas re-formed-gas process and the like, so far as I am aware.

Means are provided for introducing hydrocarbon gas or mist through 20 and 19 when desired and also through 30 and 31. These are used according to the effect desired and the nature of the raw material (hydrocarbon) available. For example if heavy oils are used they should be introduced through 36, preferably atomized by steam, and not through 20 and 19. On the other hand, using gaseous hydrocarbons such as methane, ethane, natural gas, ethylene, still gases from petroleum refineries it is possible to introduce them through 20 and 19 without causing the clogging of 26 with deposited carbon.

In the ordinary process for carbureting water gas heavy oils can not readily be used, so far as I am aware, without clogging the carburetor with carbon in a few hours of running. The reason that the carbon thus deposited does not burn during the air blast periods is, it is not heated to the ignition temperature when the steam-run ends and the air-blast begins. By introducing the heavy oil through 36 the bulk of the carbon formed and deposited lodges in the lower portion of the checker work 25 which is hotter than when ordinary carbureted water-gas is made, and the air introduced through 28 and 29 is preheated by the time it contacts the deposited carbon, hence the combustion of said carbon is readily accomplished. Moreover, the burning of this carbon is an aid in maintaining the preferred high temperature in the checker work 17. Thus the arrangement for counter-flow of hydrocarbon and secondary air through chamber 17 is beneficial in maintaining the high temperature, approximating 2000° F. and in keeping the checker work free from deposited carbon.

In the generation of gas for use in manufacturing synthetic methanol, when the proportion of CO and $H_2$ must be held within fixed limits and when the latter gases are preferred to the exclusion of other gases it is necessary to operate with fuel-bed temperatures well above the dissociation or reaction temperatures; this is provided for by adjusting the amount of air used with respect to the steam and hydrocarbon gas used; short cycles are used under these conditions. After the generator is in operation it is only necessary to analyze the make gas to determine whether or not the cycle should be changed and whether the air, steam and hydrocarbon gas are properly proportioned. For example, with insufficient air blasting (heating of the checker work during the heating period) or its equivalent, too much steam and hydrocarbon gas, the percentage of $CO_2$ and $CH_4$ in the make gas increases. With sufficient air blasting, the CO content of the make gas increases as the ratio steam to hydrocarbon gas increases. Should it be desirable to materially increase the content of $H_2$ beyond that shown in equations 6 to 14 it is only necessary to materially reduce the amount of steam used and allow reactions 2 to 5 to take place according to the hydrocarbon used.

The paraffins are not the only hydrocarbon gases which can be used in the production of mixed CO and $H_2$ by chemical reaction with steam; they are mentioned in particular because they are commercially available in large quantities. Ethylene ($C_2H_4$) a byproduct in the cracking of petroleum in the manufacture of gasoline is also a suitable hydrocarbon for the purpose, as shown by the following equations:

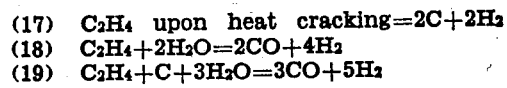

(17) $C_2H_4$ upon heat cracking $= 2C + 2H_2$
(18) $C_2H_4 + 2H_2O = 2CO + 4H_2$
(19) $C_2H_4 + C + 3H_2O = 3CO + 5H_2$ Other olefins or unsaturated hydrocarbon gases than $C_2H_4$ may be used either in the generation of the primary generator-gas (re-formed gas), or in the enriching step where they are introduced above, or along with steam into a stream of the hot-re-formed gas. These hydrocarbon gases may be used alone or mixed with other hydrocarbon gases, saturated or unsaturated. For example, $C_2H_4$ may be used alone in either or both phases of the gas-making process. In petroleum refining certain hydro-carbon gases are now available in a high degree of purity and hence when one or two such hydrocarbons are used in enriching very close control can be maintained over the gas-making operations and a higher efficiency obtained. Besides ethylene, we have in particular as by-products in petroleum refining, such olefins as $C_3H_6$ and $C_4H_8$. These gases are particularly well adapted for use as enrichers, and when their reaction in part only is desired there is the added advantage that an odor is given to the finished gas by the unreacted unsaturates, particularly $C_4H_8$ which has a strong odor. One of the fundamentals of my process, then, consists in: causing steam and hydrocarbon gas to be introduced simultaneously into an incandescent mass of solids, which mass may or may not comprise coal, coke or the like and causing said steam and gas to react chemically in definite proportions which are substantially one molecule of $H_2O$ for every carbon atom present in the reacting hydrocarbon gas. One complete cycle of operation, using a multiple-shell set, as shown in Figure 1, and using hydrocarbon gas on both the up and down runs is substantially as follows: Up blast the ignited fuel in the generator with air until it is incandescent, meanwhile conducing the blast gas into the attached checker chambers 17 and 18, burning it therein by the addition of secondary air admitted through 29 and causing the burned gas to pass out of said chambers through 23; discontinuing the air-blasting (heating operation) and introducing steam into 18 through 19, simultaneously introducing a hydrocarbon into the stream of superheated steam through inlet 36, causing both to pass upwardly through chamber 17, and into the generator 1, through 11, removing the gas generated through 12', subsequently repeating the operation but conducting the gas-steam mixture from 17 into the generator through 12 and removing the resulting gas through the upper outlet 11 and 13', valve 13 being closed and valve 14 open in this instance.

A modification of my method of operating is to make the down-run through the generator as described and subsequently make the up run by admitting steam (or steam and gas through 6 and 10) through 6, removing the generator gas through 11, 17, 18 and 22, simultaneously introducing enricher through 30 and 31, or, if 25 is too hot for the purpose, through 36.

It is preferable to maintain as high a temperature in chamber 17 as is practicable and a somewhat lower temperature in chamber 18, the superheater. In this manner the gaseous mixture or product from chambers 17 and 18 are at a maximum temperature when introduced into the generator, thus assuring a maximum final conversion of them to CO and $H_2$; on the other hand, when water gas or other lean gas for enriching is made in the generator and subsequently passed through the chambers 17 and 18 and when it is desirable to crack hydrocarbons therein in a stream of said lean gas, it is sometimes preferable to introduce said hydrocarbons into said stream in the highly heated chamber (chamber 17) passing the stream from the hottest to cooler zones in its course through the set. Obviously, instead of making alternate up and down runs, split runs can be made or a combination of split runs and up and down runs; this is a common practice in water-gas generation. Likewise, steam alone may be used during some of the runs, omitting the hydrocarbon gas in order to correct any deviation from the selected or desired percentages of carbon monoxide and hydrogen in the finished gas, as well as for reasons already given.

When it is intended to use the gas made as city-gas, enricher may be added to the "make gas" flowing through the checker chambers 17 and 18 or elsewhere. If oil is used as enricher it can be cracked more efficiently in the atmosphere of $CO + H_2$ than in the oil-gas process; the efficiency of gasification in the latter process being less than 50 per cent, whereas with the same gas oil the gasification efficiency in the cracking of said oil in an atmosphere of $CO + H_2$ is 70 per cent or more. When sufficient hydrocarbon gas is available, I prefer to enrich the $CO + H_2$ mixture by introducing the former into the latter in the checker chamber 17. A special inlet for it is not shown for simplicity, since about the same result is obtained by opening valve 9 on the up runs and valve 10 on the down runs. This method of introducing the enricher tends to keep valves 13 and 14 cool. It is common knowledge that hydrocarbons of high molecular weight decompose by the action of heat more readily than methane. It is not common knowledge that using mixed hydrocarbon gases along with steam in a heated chamber, the higher hydrocarbons only can be caused to react with steam forming CO and $H_2$. This, I find, I can accomplish, the final or resulting gas comprising CO, $H_2$ and $CH_4$ in proportional amounts varying with the composition of the original gas used. Now in using natural gas advantageously in the re-forming process it is desirable to completely re-form it into CO and $H_2$ and to utilize in the process the heat available in the blast gas. Basically it is not new to utilize this heat for the purpose but the manner in which I accomplish my purpose is new so far as I am aware. The natural gas (or natural gas product) is completely re-formed in the generator for the purpose of obtaining a high gas-making capacity and to obtain a high-hydrogen gas in which to conduct carburetion. Because the amount of waste heat—heat in the blast gas—is limited it is desirable, in the enriching stage to use propane, butane, natural gasoline or the like (as a gas) by introducing such material along with sufficient steam to prevent carbon formation, into a carbureting or heated checker chamber into a stream of said re-formed gas, the checkers in said chamber being heated to a temperature satisfactory for the purpose. In utilizing this available heat to advantage and to produce the greatest enriching effect it is preferable to use butane, natural gasoline gas or similar gas. The reasons being: (a) the volume of light hydrocarbons produced from a unit volume of enricher is greater with the hydrocarbon gases of higher molecular weight and, in the paraffin series the $C:H_2$ ratio increases somewhat with increasing molecular weight. (b) These gases, differing from oil vapors, lend themselves to more complete blending with steam and with the $H_2$ of the re-formed gas, than oil mists sometimes referred to as oil vapor.

There are conditions and localities in this country where it is necessary to alter the gas making process used in generating city gas because of a variation in the supply of natural gas and variation in demand for gas. I believe I have a "flexible" unit which may be subjected to considerable variation in operation without materially altering the quality of the finished gas. For example, in the apparatus shown in Figure 1, water-gas ($CO+2H_2$) can be made in the generator 1 almost entirely from hydrocarbon gas, such as natural gas, and enriched with natural gas when the supply of the latter is sufficient to meet the demand. On the other hand, when this supply is low, a CO and $H_2$ mixture can be made in the generator essentially from other fuel, using the natural gas for enriching only; in extreme cases the enriching can in part be done by introducing gas oil into the checker chambers, as in the standard carburetted-water-gas process. It may be done by introducing hydrocarbon gas through 10 or 9 on up and down runs respectively during the latter part of the steam runs, or of the steam-gas runs.

In making straight CO and $H_2$ mixtures, containing only small percentages of other gases, from hydrocarbon gas as a base raw material, or from both hydrocarbon gas, and other fuel, the temperature of the checker bricks in chambers 17 and 18 should be appreciably higher than is common practice in making carburetted water-gas. The temperature in 17 should approximate 2000° F. whereas that in 18 should be preferably above 1200 degrees Fahrenheit; average temperatures of 1750 and 1900 degrees Fahrenheit are commonly satisfactory. When gas oil is used and a carburetted gas, such as city gas, is made, lower temperatures are sometimes more satisfactory. The latter is also true when carburetting by introducing hydrocarbon gas into the gas entering checker chambers 17 and 18 from the generator.

I find that in enriching the re-formed gas which comprises chiefly $CO+2H_2$ and some steam, by introducing into a stream of it in the heated carbureting chambers, or at an equivalent point, both steam and a hydrocarbon gas including other hydrocarbon gases than methane, the higher hydrocarbon gases are substantially completely converted into CO, $H_2$ and $CH_4$, whereas the methane originally present is not appreciably decomposed but remains in the enriched gas. This result is accomplished without appreciable formation of either carbon or tar, which differentiates the process from the oil-gas process, or other carbureting processes involving pyrogenetic reactions, so far as I am aware. I therefore obtain an effect that I believe to be new, when I carburet in an atmosphere of $CO+2H_2+$ steam, using hydrocarbon gases as enriching material; the final enriched re-formed gas made comprising as combustible matter almost entirely CO, $H_2$ and $CH_4$. The amount of illuminants present in the enriched gas thus made usually being less than 2.0 per cent.

However, as already pointed out in this specification, when gas oil or other liquid carbureting material is used during the enriching stage in place of the preferred gaseous hydrocarbons, it can be more completely and efficiently gasified in the atmosphere containing an appreciable amount of steam and a higher percentage of hydrogen in the combustible constituents than is found in water gas as commonly produced. Equation 10 typifies the reaction known as the water-gas reaction.

Coal, coke or the like, is a satisfactory filler for generator 1 and is a splendid contact medium for carrying on reactions as represented by Equations 2 to 19 inclusive, but for the reactions represented by Equations 2 to 9 inclusive, and 17 and 18, solid fuel is not essential; a hot refractory surface is satisfactory in Figure 1. A modification of the generator with such a provision and without provision for supplying a solid fuel thereto, is shown in Figure 2.

Referring to Figure 2 the operation is substantially the same as in Figure 1, the refractory (checker brick) shown at 32 and 33 are heated by burning fuel in the generator by air-blasting, the fuel in this instance being gaseous and admitted into 34 and the air being admitted through 15. Subsequently steam and hydrocarbon gas are passed simultaneously through the heated mass of refractory and the chemical reactions are caused to take place. The air-blasting is upward and the runs are made either up or down, but preferably more down than up. The generator in this instance is not shown connected with carbureting or superheating chambers, but may be so connected, as shown in Figure 1.

Referring again to Fig. 1, when it is desirable not to completely crack all of the hydrocarbon gas used in the process, and yet to maintain high temperatures in the chambers 17 and 18, the operation may be so conducted that the gas produced in the generator does not pass through chambers 17 and 18. In this manner the checker bricks in the latter chambers can be used to full advantage for producing carbon monoxide and hydrogen from steam and hydrocarbon gas by admitting the latter materials respectively through 19 and 36.

I do not claim as my own the step comprising the carburetion of water-gas by the addition thereto of cold hydrocarbon gas without cracking.

What I claim is:

1. The method of making combustible gas which consists of air-blasting an ignited fuel bed with air to bring it to incandescence, discontinuing said air-blasting, separately introducing a hydrocarbon into a stream of superheated steam, causing said steam and hydrocarbon to become thoroughly mixed and simultaneously heated to a temperature above 1000° F., and introducing the heated gaseous product into the incandescent fuel bed from above it, removing the resulting gas from beneath it; the gas generated having a hydrogen to carbon monoxide ratio from about two to one to three and one-half to one and being substantially free from suspended carbon resulting from pyrolysis of said hydrocarbons.

2. The method of making combustible gas which consists of air blasting an ignited fuel bed to bring it to incandescence, conducting the blast gases through checker work chambers in connection with said fuel bed to thereby heat the checker work, discontinuing said air blasting, injecting steam and a hydrocarbon gas into said checker work causing reactions to occur whereby the resulting gas consists essentially of methane, hydrogen and carbon monoxide with some undecomposed steam, passing the heated gaseous products and steam downwardly through the incandescent fuel bed, said steam and hydrocarbon being mixed in such proportions that the ratio of hydrogen to carbon monoxide in the generated gas is from about two to one to three and one-half to one, the generated gas being substantially free from suspended carbon resulting from pyrolysis of said hydrocarbon.

3. The method of making combustible gas which consists of air blasting an ignited fuel bed to bring it to incandescence, conducting the blast gases through checker work chambers in connection with said fuel bed to thereby heat the checker work, passing steam and a hydrocarbon gas through said checker work and then downwardly through the incandescent fuel bed thereby generating a gas substantially free from suspended carbon resulting from pyrolysis of said hydrocarbon, said gas having a hydrogen to carbon monoxide ratio from about three to one to three and one-half to one, discontinuing the passage of gas and steam downwardly through said fuel bed and then passing steam upwardly through said fuel bed to produce water gas.

4. In the method of making combustible gas, a cycle which consists of air-blasting an ignited fuel bed of solid fuel to incandescence, blasting said incandescent fuel bed downwardly with steam and a gaseous hydrocarbon in amounts adapted to yield a gas substantially free from suspended carbon resulting from pyrolysis of said hydrocarbon, said gas containing hydrogen and carbon monoxide in the ratio of from about two and one-half to one to three and one-half to one, discontinuing the down blasting of the fuel and blasting said fuel bed upwardly with steam only thereby generating water gas.

WILLIAM W. ODELL.